(12) United States Patent
Yu et al.

(10) Patent No.: US 7,312,588 B1
(45) Date of Patent: Dec. 25, 2007

(54) BALLAST WITH FREQUENCY-DIAGNOSTIC LAMP FAULT PROTECTION CIRCUIT

(75) Inventors: Qinghong Yu, Reading, MA (US); Joseph L. Parisella, Beverly, MA (US)

(73) Assignee: Osram Sylvania, Inc., Danvers, MA (US)

(*) Notice: Subject to any disclaimer, the term of this patent is extended or adjusted under 35 U.S.C. 154(b) by 0 days.

(21) Appl. No.: 11/532,235

(22) Filed: Sep. 15, 2006

(51) Int. Cl.
*G05F 1/00* (2006.01)

(52) U.S. Cl. ............... 315/291; 315/224; 315/225; 315/209 R; 315/324; 315/360; 315/DIG. 5; 315/DIG. 7

(58) Field of Classification Search ............ 315/209 R, 315/224, 225, 247, 244, 119, 123, 128, 294, 315/312, 324, 276, 360, 362, 325, DIG. 5, 315/DIG. 7
See application file for complete search history.

(56) References Cited

U.S. PATENT DOCUMENTS

| | | | |
|---|---|---|---|
| 4,488,199 | A | 12/1984 | Bloomer |
| 5,619,105 | A | 4/1997 | Holmquest |
| 5,751,115 | A | 5/1998 | Jayaraman et al. |
| 5,751,120 | A | 5/1998 | Zeitler et al. |
| 5,770,925 | A | 6/1998 | Konopka et al. |
| 5,777,439 | A | 7/1998 | Hua |
| 5,872,429 | A | 2/1999 | Xia et al. |
| 5,883,473 | A | 3/1999 | Li et al. |
| 5,945,788 | A | 8/1999 | Li et al. |
| 6,037,722 | A | 3/2000 | Moisin |
| 6,222,322 | B1 | 4/2001 | Stack |
| 6,292,339 | B1 | 9/2001 | Brooks |
| 6,400,095 | B1 | 6/2002 | Primisser et al. |
| 6,720,739 | B2 | 4/2004 | Konopka |
| 6,809,483 | B2 | 10/2004 | Alexandrov |
| 7,042,161 | B1 | 5/2006 | Konopka |
| 7,084,582 | B2 * | 8/2006 | Buonocunto ............... 315/247 |
| 7,098,605 | B2 * | 8/2006 | Oh .............................. 315/291 |
| 7,102,297 | B2 | 9/2006 | Trestman et al. |
| 7,154,232 | B2 * | 12/2006 | Contenti et al. ............ 315/225 |
| 2002/0113559 | A1 | 8/2002 | Lam |
| 2004/0227471 | A1 * | 11/2004 | Ribarich ..................... 315/291 |
| 2005/0046357 | A1 | 3/2005 | Stack |

* cited by examiner

*Primary Examiner*—Haissa Philogene
(74) *Attorney, Agent, or Firm*—Fitch, Even, Tabin & Flannery; Kenneth D. Labudda

(57) ABSTRACT

A ballast (20) for powering one or more gas discharge lamps (70,72,74,76) comprises an inverter (200) and a lamp fault protection circuit (400). Inverter (200) has an operating frequency that is load-dependent. Lamp fault protection circuit (400) monitors an electrical signal within inverter (200). In response to a change in the fundamental frequency of the electrical signal, such as what occurs when a lamp is removed, when a lamp approaches the end of its operating life, or when an arcing condition occurs at one or more of the ballast output connections (302,304,306,308,310), lamp fault protection circuit (400) disables the inverter (200) for a predetermined shutdown period. Lamp fault protection circuit (400) also provides a restart function for periodically attempting to ignite and operate the lamps. Additionally, in response to a sustained fault condition, lamp fault protection circuit (400) increases the predetermined shutdown period so as to minimize any undesirable effects due to the restart function. Lamp fault protection circuit (400) is preferably realized using a suitable microcontroller integrated circuit (420) with associated discrete circuitry, and is especially well-suited for use in ballasts for powering multiple lamps via a current-fed self-oscillating inverter and an isolated parallel resonant output circuit.

32 Claims, 3 Drawing Sheets

BALLAST WITH FREQUENCY-DIAGNOSTIC LAMP FAULT PROTECTION CIRCUIT

FIELD OF THE INVENTION

The present invention relates to the general subject of circuits for powering discharge lamps. More particularly, the present invention relates to a ballast that includes a lamp fault protection circuit.

RELATED APPLICATIONS

The subject matter of the present application is related to that of U.S. Pat. No. 6,720,739 B2 (titled "Ballast with Protection Circuit for Quickly Responding to Electrical Disturbances," issued on Apr. 13, 2004, and assigned to the same assignee as the present application), U.S. Pat. No. 7,042,161 B1 (titled "Ballast with Arc Protection Circuit," issued on May 9, 2006, and assigned to the same assignee as the present application), U.S. Pat. No. 7,102,297 B2 (titled "Ballast with End-of-Lamp-Life Protection Circuit," issued on Sep. 5, 2006, and assigned to the same assignee as the present application), and U.S. patent application Ser. No. 11/532,277 (titled "Ballast with Arc Protection Circuit," filed on the same date, and assigned to the same assignee, as the present application), the disclosures of which are incorporated herein by reference.

BACKGROUND OF THE INVENTION

Electronic ballasts generally include an inverter that provides high frequency current for efficiently powering gas discharge lamps. Inverters are commonly classified according to switching topology (e.g., half-bridge or push-pull) and the method used to control commutation of the inverter switches (e.g., driven or self-oscillating). In many types of electronic ballasts, the inverter provides an output voltage that is processed by a resonant output circuit to provide a high voltage for igniting the lamps and a magnitude-limited current for powering the lamps.

When the lamps fail, are removed, or otherwise cease to operate in a normal fashion (e.g., such as what occurs during so called "diode mode" operation), it is highly desirable that the inverter be shut down or at least shifted to a different (e.g., low power) mode of operation. This is necessary in order to minimize power dissipation, reduce heating in the ballast, and protect the components of the ballast from damage due to excessive voltage, current, and heat. Circuits that shut down or alter the operation of the inverter in response to a lamp fault condition are customarily referred to as lamp fault protection circuits.

Many of the existing approaches to lamp fault protection rely upon detecting asymmetries in either the lamp voltage or the lamp current as an indication that a lamp fault condition has occurred. For example, U.S. Pat. No. 5,777,439 discloses an arrangement wherein rectifying devices are connected to both sides of a lamp in order to detect an unbalanced voltage (which is known to be indicative of at least certain types of lamp failure modes, such as diode mode operation). Such a fault detection approach is effective and economical for ballasts that have a non-isolated output (i.e., no output transformer interposed between the resonant output circuit and the connections to the lamps), but it is not well-suited for those types of ballasts (e.g., a ballasts that includes a current-fed self-oscillating inverter and a parallel resonant output circuit with an output transformer) that inherently provide electrical isolation between the ballast circuitry and the connections to the lamps. For the latter type of ballasts, any signal indicative of a lamp fault condition must be transferred from the secondary side of the output transformer to the primary side via a suitable isolation device, such as an optocoupler, before it can be used to control operation of the inverter. As can be expected, the added presence of an isolation device increases the cost and complexity of the ballast.

Many existing ballasts with lamp fault protection circuits respond to a lamp fault condition by shutting down the inverter and then keeping the inverter off for as long as power continues to be applied to the ballast. With such ballasts, following replacement of a failed lamp with an operational lamp, it is required that power to the ballast be turned off and then on again (i.e., "cycled") in order to effect ignition and powering of the lamps in the fixture. This requirement poses a considerable inconvenience in many applications, such as in large office areas or factories, in which a large number of ballasts are often connected in the same branch circuit. In such environments, with many existing ballasts, it is necessary to momentarily interrupt the lighting in a large area in order to restore desired operation to even a single lighting fixture after one or more of its lamps are replaced. It is thus desirable to have a ballast that accommodates relamping without requiring that the power to the ballast be removed and reapplied.

It is important that lamp fault detection be inhibited during certain operating periods, such as inverter startup and lamp ignition. For instance, the normal starting process of the inverter and lamps is generally accompanied by the same types of electrical disturbances that occur during a lamp fault condition. Thus, unless lamp fault detection is inhibited during inverter startup and lamp ignition, the inverter may be preventing from properly starting and/or the ballast may be prevented from properly igniting the lamp. Additionally, although most lamps are capable, under ideal conditions, of igniting and operating normally within a short period of time (e.g., 20 milliseconds), some lamps, due to age or low temperature, require a much longer time to ignite and stabilize. Thus, lamp fault detection should be inhibited for a period that is long enough (e.g., at least 200 milliseconds or so) to accommodate lamp starting under conditions that are less than ideal.

It is desirable that a ballast possess some type of automatic restart capability wherein, within a specified time following detection of a lamp fault condition and shutdown of the ballast, periodic attempts are made to restart the ballast and ignite the lamp. This feature is desirable in order to prevent a "latched" shutdown of the ballast (which necessitates that power to the ballast be turned off and then on again in order to reset the ballast) in the event of false detection due to a momentary power line transient or any of a number of anomalous phenomena (e.g., electrical noise) that pose no real threat to ballast reliability or safety. Also, because lamps are somewhat unpredictable, it is possible that an otherwise "good" lamp may sometimes fail to properly start on the first attempt. In such a case, a ballast with automatic restart capability will periodically attempt to start the lamp, rather than simply latching the ballast or its inverter in a shutdown state until such time as the power to the ballast is cycled.

For ballasts that power multiple lamps and that includes automatic restart capability, in the event of a sustained lamp fault condition (i.e., a lamp fault condition that remains present for an extend period of time such as, e.g., hours, days, weeks, months, etc.), the periodic (but unsuccessful) attempts to restart the ballast and ignite the lamps results in a regular (e.g., once per second) brief flashing of any remaining operational lamp(s). This regular brief flashing, which occurs on a sustained basis until either the lamp fault condition is corrected or power is removed from the ballast, is considered to be visually annoying to occupants who are in the vicinity of the affected lighting fixture. Additionally, the periodic restart attempts are stressful to the components within the ballast. Thus, a need exists for a lamp fault protection approach that not only minimizes visual annoyance to occupants, but that also avoids placing unnecessary stress upon the ballast components.

Ballasts for gas discharge lamps provide high ignition voltages for starting the lamps. The ignition voltages supplied by preheat type ballasts are typically on the order of several hundred volts (e.g., 500 volts peak), while those provided by instant-start type ballasts may exceed 1000 volts peak. As a consequence of these high ignition voltages, ballasts are subject to a special type of lamp fault condition that is commonly referred to as output arcing.

Output arcing may occur in any of a number of different ways. For example, in fluorescent lighting installations, it is a common practice to replace failed lamps while AC power is applied to the ballast. This practice is referred to as "live" relamping. During live relamping, as a lamp is being removed or inserted, a momentary arc may form between the fixture socket contacts and a pin of the lamp. As another example, a sustained arc (as opposed to a momentary arc) may occur due to poor or faulty connections in the output wiring or the lamp sockets, or if a lamp is improperly installed in such a way that a small gap exists between the lamp pins and the contacts within the fixture sockets. If a connection to a lamp is compromised due to a defective lamp socket or defective wiring, a high intensity, high temperature arc may be produced across the air gap caused by those faulty connections.

Arcing is generally acknowledged to cause degradation of the contacts in the fixture sockets and undue stress on components within the ballast. Sustained arcing is especially undesirable because of its tendency to produce potentially destructive heating. In order to minimize any ill effects due to arcing, it is important that the arc be promptly extinguished. This requires a ballast that is capable of quickly and reliably detecting an arc and, subsequently, taking appropriate action to promptly extinguish the arc.

The prior art includes a number of circuits for detecting and/or protecting against output arcing. A more thorough discussion of the problems and prior art relating to output arcing is provided in U.S. patent application Ser. No. 11/532,277 (titled "Ballast with Arc Protection Circuit," filed on the same date, and assigned to the same assignee, as the present application), the disclosure of which is incorporated herein by reference.

Existing approaches for lamp fault protection are largely limited to protecting against more conventional types of lamp faults (e.g., failure or removal of a lamp, diode mode operation, and degassed lamp), and do not provide reliable protection against output arcing. Conversely, existing approaches for protecting against output arcing generally do not protect against more conventional types of lamp faults. Thus, a need exists for an approach that reliably combines protection against conventional lamp faults with protection against output arcing.

A significant shortcoming of many existing protection approaches is that the employed circuitry generally provides for "analog" type detection (as opposed to "digital" type detection). Besides being susceptible to problems attributable to electrical noise, analog approaches are generally sensitive to variations in component tolerances and operating parameters, and are therefore often quite lacking as to robustness. More particularly, analog approaches are generally incapable of compensating for the fact that significant parameters of the ballast circuitry and the lamps tend to vary with time and temperature. For example, it is well known that the operating voltage and current of a gas discharge lamp tends to significantly change as the lamp "warms up." As another example, certain ballast components such as integrated circuits are prone to considerable parameter variations (e.g., in the frequency of the internal oscillator) as the ballast ambient temperature changes. In some applications, some of the deficiencies attributable to component tolerances and parameter variations can be reduced by design measures (e.g., using components with "tight" tolerances), but almost certainly at the price of substantial added cost to the ballast. As yet another example, the nature (e.g., lead length, spacing, etc.) of the wiring within the lighting fixture often exerts a significant effect (due to parasitic capacitances, and such) upon the operation of the ballast and lamps. Thus, a further need exists for a protection approach that is substantially insensitive to, or at least capable of largely compensating for, at least some of the more significant component tolerances and parameter variations, as well as sources of electrical noise, that are inherent in electronic ballasts, gas discharge lamps, and lighting fixtures, but that is still capable of being implemented in an economical and robust manner.

Yet another shortcoming of many existing approaches to lamp fault protection is that those circuits often require a considerable amount of operating power. Typically, the operating power requirements increase with circuit complexity, especially when analog circuitry is extensively employed. Consequently, those circuits significantly detract from the overall energy efficiency of the ballast. Thus, a further need exists for a lamp fault protection circuit that, in comparison with existing approaches, has relatively modest operating power requirements.

Ballasts with a current-fed self-oscillating inverter and a parallel resonant output circuit are currently the prevailing "instant start" design topology in North America. However, providing reliable lamp fault protection within these types of ballasts presents a significant engineering challenge. As previously discussed, existing approaches based upon analog detection have a number of deficiencies, including costly/complicated circuitry, susceptibility to electrical noise, sensitivity to parameter variations and component tolerances, and a need for providing electrical isolation between at least portions of the lamp fault protection circuit and the rest of the ballast circuitry. Additionally, many prior art approaches are susceptible to problems relating to detection resolution, and are therefore ill-suited for ballasts that power multiple (e.g., three or four) lamps. For example, in a ballast for powering three or four lamps and in the case of a lamp fault condition that involves only one lamp, any signal that is intended to be indicative of a lamp fault condition may be "swamped out" by the fact that the remaining two or three lamps are operating in a substantially normal manner. Because of this problem, one existing approach has been to provide a separate inverter and output circuit for each of the lamps powered by the ballast; such an approach has the obvious disadvantage of being quite expensive, especially for ballasts that power three or four lamps (in which case three or four separate inverters and output circuits are required).

Thus, a need exists for a ballast having a lamp fault protection circuit that, in addition to protecting against conventional lamp fault conditions, is capable of protecting against damage (to the ballast and its associated lighting fixture) due to the output arcing. A need also exists for a lamp fault protection circuit that is capable of detecting a lamp fault condition in a reliable manner and that is substantially insensitive to electrical noise and to problems/variances attributable to component tolerances, fixture wiring, number of lamps, and operating parameters within the ballast, lamps, and lighting fixture. A need also exists for a ballast and lamp fault protection circuit that provide a starting (i.e., inhibit) period in order to allow for proper lamp starting. A further need exists for a ballast and lamp fault protection circuit that provide automatic restart capability in order to accommodate false detection and anomalous starting failure of a "good" lamp. A further need exists for a ballast and lamp fault protection circuit that provide automatic restart capability, but that also minimize visually annoying flashing and unnecessary stress to ballast components when a lamp fault condition remains present for an extended period of time. A further need exists a lamp fault protection circuit with modest operating power requirements. A further need exists for a lamp fault protection circuit that provides all of the aforementioned functional benefits, and that is readily and economically implemented within existing ballasts. Such a ballast and lamp fault protection circuit would represent a considerable advance over the prior art.

DETAILED DESCRIPTION OF THE PREFERRED EMBODIMENTS

Figure 1:
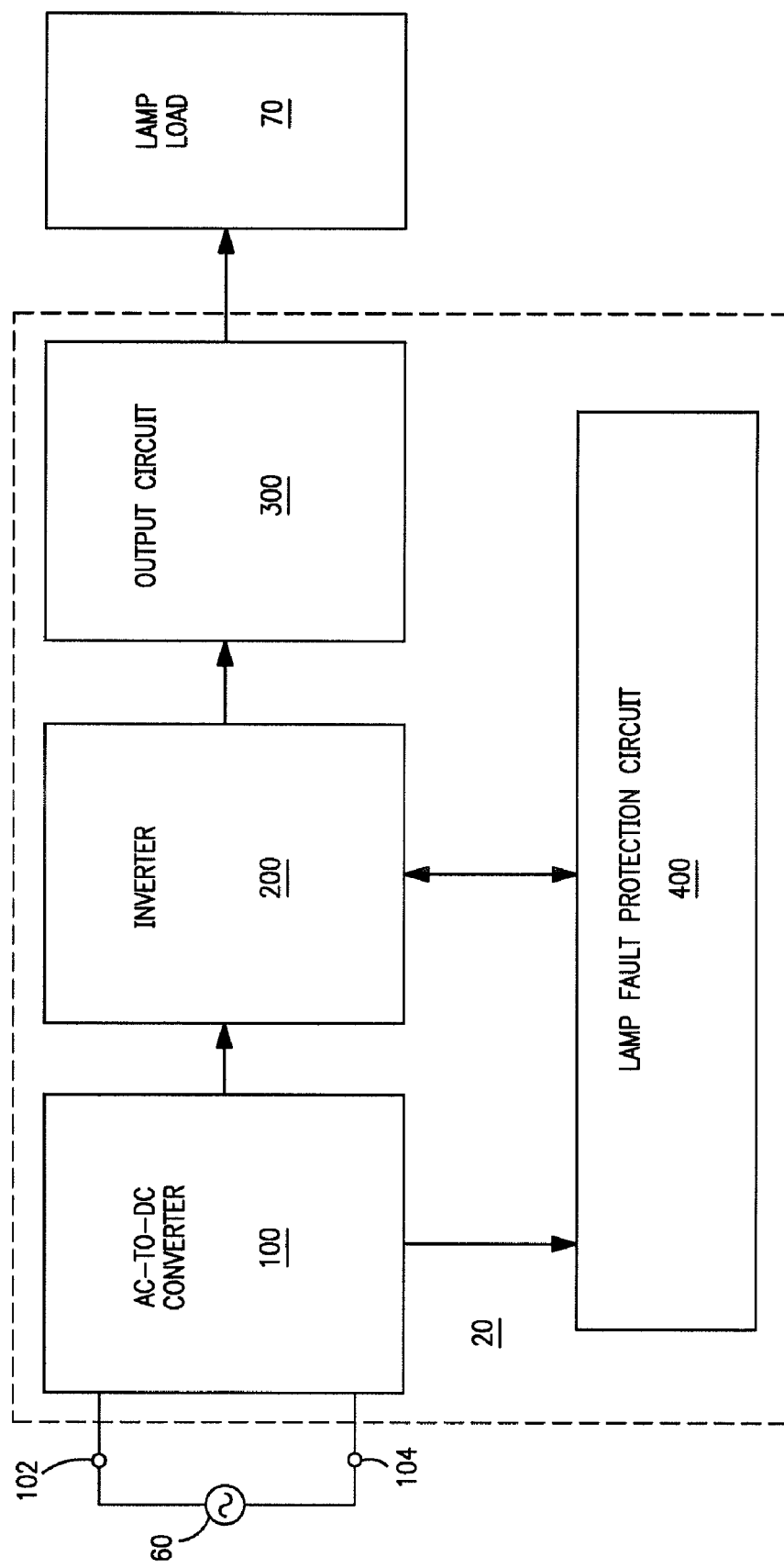
FIG. 1 is a block electrical diagram of a ballast with a lamp fault protection circuit, in accordance with the preferred embodiments of the present invention.

Referring to FIG. 1, a ballast 20 for powering a lamp load 70 (that includes one or more gas discharge lamps) comprises an AC-to-DC converter 100, an inverter 200, an output circuit 300, and a lamp fault protection circuit 400. AC-to-DC converter 100 has inputs 102,104 for receiving an AC supply voltage 60 (e.g., 277 volts rms at 60 hertz). During operation, AC-to-DC converter 100 provides a DC rail voltage to inverter 200. Inverter 200 is characterized by having a load-dependent operating frequency; that is, the operating frequency of inverter 200 changes with the number, type, and operational condition of the lamps that constitute lamp load 70. Output circuit 300 is coupled to inverter 200, and is adapted for coupling to lamp load 70. Lamp fault protection circuit 400 is coupled to inverter 200; optionally, lamp fault protection circuit 400 is also coupled to AC-to-DC converter 100.

During operation, lamp fault protection circuit 400 monitors the fundamental frequency of an electrical signal within inverter 200 for indication of a lamp fault condition. When ballast 20 and lamp load 70 are operating in a normal manner, the electrical signal within inverter 200 will be a periodic signal having a predetermined normal fundamental frequency (e.g., 40 kilohertz) corresponding to a normal operating frequency of inverter 200. A lamp fault condition is deemed to have occurred when the fundamental frequency of the electrical signal exhibits a change that exceeds a predetermined threshold change (e.g., on the order of several hundred hertz, between about 0.1% and 1% of the normal operating frequency of inverter 200, etc.).

Preferably, lamp fault protection circuit 400 operates such that a lamp fault condition is deemed to have occurred when the predetermined threshold change in the fundamental frequency of the electrical signal is a relatively abrupt change. More particularly, in the present context, "abrupt change" refers to a change that occurs within a relatively short timeframe (e.g., on the order of about 100 milliseconds or less) that is dramatically shorter than the time that is normally required for the operating parameters of the ballast and lamps to change in any significant manner. For instance, the normal warm up process of the lamps causes the lamp current and lamp voltage to change over time, but those changes typically require a relatively long period of time (e.g., tens of seconds, several minutes or more, etc.) before being measurably significant. As another example, operation of ballast 20 is naturally accompanied by an increase in the ambient temperature within ballast 20, which causes corresponding changes in temperature-dependent parameters of at least some of the components within inverter 200; those changes typically require a significant period of time (e.g., certainly much more than 100 milliseconds or so) before having any significant measurable effect upon the operating frequency of inverter 200.

Advantageously, because lamp fault protection circuit 400 looks to a change in the fundamental frequency (as opposed to looking to the absolute value of the fundamental frequency, and then comparing that to some predetermined reference value for the fundamental frequency) as indicative of a lamp fault condition, ballast 20 and lamp fault protection circuit 400 provide a kind of lamp fault protection that is largely insensitive to component tolerances and other sources of variance (e.g., fixture wiring) that typically detract from the reliability and accuracy of more conventional fault protection approaches. Moreover, because lamp fault protection circuit 400 preferably treats only an abrupt (as opposed to a more gradual) change in the fundamental frequency as indicative of a lamp fault condition, ballast 20 and lamp fault protection circuit 400 provide a kind of lamp fault protection that is highly robust and substantially insensitive to parameter changes that occur over a more extended period of time.

During operation, lamp fault protection circuit 400 provides a starting period during which inverter 200 is enabled and allowed to attempt to start the lamps, regardless of whether or not a lamp fault condition appears to be present. Thus, lamp fault protection is effectively inhibited during the starting period. Inhibition of lamp fault protection during the starting period is desirable because the normal starting process of a lamp is typically accompanied by disturbances which are generally indistinguishable from a legitimate lamp fault condition. Preferably, the starting period is chosen to be between about 200 milliseconds and about one second, which typically provides sufficient time to allow the lamp(s) to ignite and stabilize, even under conditions involving aged lamps or low ambient temperatures.

After completion of the starting period, if a lamp fault condition is present (as indicated by an abrupt change in the fundamental frequency of the monitored electrical signal), lamp fault protection circuit 400 disables inverter 200 and keeps the inverter disabled for a shutdown period. Preferably, the shutdown period is chosen to have a time duration that is, at least initially, on the order of about one second or so; in the event of a sustained lamp fault, the duration of the shutdown period is preferably increased by a substantial amount (preferably, on the order of at least five seconds or so).

When a lamp fault condition occurs, lamp fault protection circuit 400 reliably detects the fault condition and then promptly disables inverter 200. Typical lamp fault conditions to which lamp fault protection circuit 400 is responsive include: (i) disconnection of one or more lamps from the ballast; (ii) failure of at least one of the lamps to operate in a substantially normal manner; and (iii) an arcing condition at the lamp load. Each of these fault conditions is characterized by causing an abrupt change in the fundamental frequency of the monitored signal within inverter 200. Lamp fault protection circuit 400 detects this abrupt change in the fundamental frequency, disables inverter 200, and then ensures that inverter 200 remains disabled for at least the duration of the shutdown period.

After completion of the shutdown period, lamp fault protection circuit 400 again provides the starting period, during which time inverter 200 is re-enabled and allowed to attempt to start the lamp, independent of whether or not a lamp fault condition appears to be (or in fact is) present. This feature not only accommodates relamping (wherein a failed lamp may be replaced, and subsequently ignited and operated, without requiring that the power to the ballast be removed and then reapplied), but also allows the ballast and lamps to recover from situations such as "false detection" (wherein a legitimate lamp fault condition appears to be present, but actually is not) and anomalous starting failure (wherein a "good" lamp does not ignite on the first attempt, but does so after one or more successive attempts).

Preferably, lamp fault protection circuit 400 is configured such that, if a lamp fault condition remains present after a predetermined number (e.g., 10 or so) of starting periods have been successively provided (e.g., a first starting period, followed by a first shutdown period, following by a second starting period, following by a second shutdown period, . . . , followed by a tenth starting period), the shutdown period is increased from a first duration (e.g., the normal initial shutdown period of about 1 second or so) to a second duration (e.g., about 5 seconds or so), and is then maintained at the second duration until at least such time as the lamp fault condition is no longer present. This feature replaces a sustained rapid (i.e., once per second or so) flashing of any remaining operational lamps with a sustained occasional (i.e., once every 5 seconds or so) flashing of any remaining operational lamps, thereby greatly reducing the visual annoyance to occupants. Additionally, because inverter 200 is restarted much less frequently than before (e.g., once every 5 seconds or so instead of once every second or so), this feature dramatically reduces the frequency with which the components within ballast 20 are subjected to the considerable electrical stresses that typically accompany inverter startup and lamp ignition; naturally then, it is expected that this feature contributes to enhancing the useful operating life of ballast 20.

During operation, lamp fault protection circuit 400 monitors the fundamental frequency of the electrical signal by monitoring the number of cycles that occur in the electrical signal during a sampling period. The sampling period has a sampling duration (e.g., 10 milliseconds). More particularly, lamp fault protection circuit 400 monitors the fundamental frequency of the electrical signal by implementing the following steps:

(1) Providing at least a first sampling period (T1) and a second sampling period (T2). The second sampling period (T2) begins at some point in time after completion of the first sampling period (T1). The first and second sampling periods have the same sampling duration.

(2) Measuring a first number of pulses (N1) that is indicative of the number of cycles that occur in the electrical signal during the first sampling period (T1).

(3) Measuring a second number of pulses (N2) that is indicative of the number of cycles that occur in the electrical signal during the second sampling period (T2).

(4) Comparing the second number of pulses (N2) with the first number of pulses (N1). A lamp fault condition is deemed to have occurred if the first number of pulses (N1) and the second number of pulses (N2) differ by more than a predetermined difference limit.

Preferably, lamp fault protection circuit 400 provides a dead period between successive sampling periods. The dead period has a predetermined dead time (e.g., 10 microseconds). In a preferred embodiment, the second sampling period begins after completion of both the first sampling period and the dead period.

During normal operation of ballast 20 and lamp load 70 (i.e., when no lamp fault condition is present), the fundamental frequency of the electrical signal does not noticeably change in the very short amount of time that elapses between the beginning of the first sampling period (T1) and the end of the second sampling period (T2). For instance, using the aforementioned example values, the time that elapses between the beginning of T1 and the end of T2 will be 20.1 milliseconds (10 milliseconds+10 microseconds of dead time+10 milliseconds), which is short enough to ensure that little or no natural change (i.e., due to normal operating changes, such as those attributable to lamp warm up, increase in the ambient temperature within ballast 20, etc.) will have occurred in the fundamental frequency during that brief time. Consequently, under normal operation, the first number of pulses (N1) and the second number of pulses (N2) will be about equal, so any difference between N1 and N2 will certainly be less than the predetermined difference limit.

For a ballast in which inverter 200 operates at, say, 40 kilohertz, and in which the sampling period is 10 milliseconds, approximately 400 cycles will occur in the monitored electrical signal during each of T1 and T2. Ideally, under normal operating conditions, N1 and N2 would each equal 400 (or, alternatively, some fixed fraction thereof). However, because the commencement of each sampling period is not time-synchronized with the cycles of the electrical signal, and because of other possible variances/tolerances within lamp fault protection circuit 400 that may affect its "pulse counting" accuracy, N1 and N2 will typically differ by at least a modest amount (e.g., a number that is on the order of 5 or less) even when no actual change occurs in the fundamental frequency. Accordingly, in practicing the present invention, it is important that the predetermined difference limit be set to a number that is high enough (e.g., at least, say, 10 or so) so that any natural difference in N1 and N2 that may occur during normal operation of the ballast and lamps is not incorrectly interpreted as being indicative of a lamp fault condition.

If a lamp fault condition does occur, the fundamental frequency of the monitored signal will abruptly change by a significant amount. For example, in the case of ballast for powering four lamps (e.g., the ballast described in FIG. 2), even if but one of the four lamps is suddenly disconnected or fails to operate, the operating frequency of inverter 200 will noticeably increase (e.g., from 40 kilohertz to 45 kilohertz). Consequently, N1 and N2 will now differ by an amount (e.g., by as much as 50 or so) that is more than adequate (i.e., more than the predetermined difference limit of, e.g., 10) to safely indicate that a lamp fault condition has occurred.

It should be understood, of course, that lamp fault protection circuit 400 provides a continuous stream of sampling periods, each sampling period being separated from the previous one and the next one by a dead time period (the duration of which is preferably chosen to be brief in comparison with the duration of the sampling period). It should also be appreciated that the comparison regarding the number of pulses need not be limited to a comparison of the number of pulses measured during two consecutive sampling periods. For instance, in the preceding examples, a comparison was made between the number of pulses occurring in the second sampling period with the number of pulses occurring in the first sampling period; in one preferred embodiment, the second sampling period immediately follows (after a dead time period) the first sampling period, but that it not necessarily true in general (e.g., as but one possibility, imagine a third sampling period occurring in time between the first and second sampling periods). Additionally, in this regard, lamp fault protection circuit 400 may be realized in any of a number of alternative ways that are not necessarily limited to a comparison involving only two individual and/or consecutive sampling periods. For example, one contemplated approach would involve comparing a first average number of pulses (taken over a first group of several sampling periods) and a second average number of pulses (taken over a second group of several sampling periods). In any event, it should be appreciated that whatever particular approach that is selected should be chosen and implemented with the goal of optimizing the accuracy and reliability of fault detection provided by lamp fault protection circuit 400.

Figure 2:
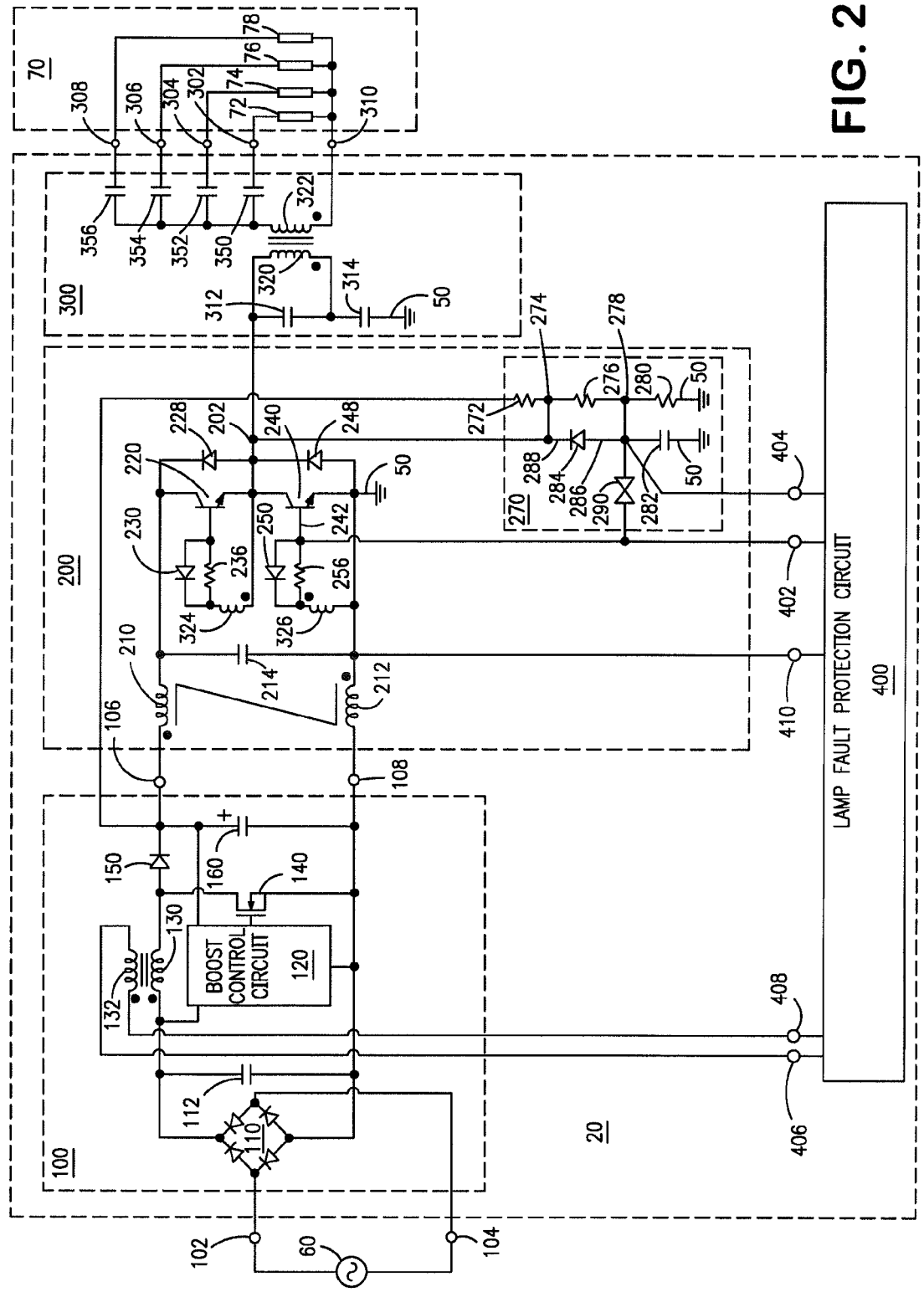
FIG. 2 is a partial block diagram schematic of a ballast with a lamp fault protection circuit and a current-fed self-oscillating half-bridge type inverter, in accordance with a preferred embodiment of the present invention.

Turning now to FIG. 2, in a preferred embodiment of the present invention, AC-to-DC converter 100 is implemented as a combination of a full-wave rectifier circuit 110 and a boost converter 120,130,140,150,160. Inverter 200 is preferably implemented as a current-fed self-oscillating half-bridge type inverter. Output circuit 300 is preferably implemented as a parallel resonant output circuit.

As described in FIG. 2, AC-to-DC converter 100 comprises input terminals 102,104, a full-wave diode bridge 110, a capacitor 112, a boost control circuit 120, a boost inductor 130, a boost transistor 140, a boost rectifier 150, a bulk capacitor 160, and output terminals 106,108. During operation, AC-to-DC converter receives (via input terminals 102, 104) an AC supply voltage (e.g., 277 volts rms at 60 hertz) from AC source 60 and provides (via output terminals 106,108) a regulated DC rail voltage (e.g., 455 volts) to inverter 200.

Inverter 200 comprises dual current-feed inductors 210, 212, first and second inverter transistors 220,240, a first base drive circuit 230,236,324, a second base drive circuit 250, 256,326, and an inverter startup circuit 270. The first base drive circuit is coupled to first inverter transistor 220, and comprises a base drive winding 324, a diode 230, and a resistor 236. The second base drive circuit is coupled to second inverter transistor 240, and comprises a base drive winding 326, a diode 250, and a resistor 256. Inverter startup circuit 270 is coupled to AC-to-DC converter 100, second inverter transistor 240, and inverter ground 50, and includes resistors 272,276,280, capacitor 282, diode 284, and diac 290. During operation, inverter 200 receives the DC rail voltage from AC-to-DC converter 100 and provides (via complementary switching of inverter transistors 220,240) a high frequency (e.g., greater than 20,000 hertz) alternating voltage to output circuit 300.

Output circuit 300 comprises output connections 302,304, 306,308,310, a resonant capacitor 312, an output transformer 320,322,324,326, a DC blocking capacitor 314, and ballasting capacitors 350,352,354,356. Output transformer 320,322,324,326 includes a primary winding 320 coupled to inverter 200, a secondary winding 322 coupled to output connections 302,304,306,308,310, a first auxiliary winding 324 that is part of the first base drive circuit within inverter 200, and a second auxiliary winding 326 that is part of the second base drive circuit within inverter 200. During operation, output circuit 300 receives the high frequency alternating voltage provided by inverter 200 and supplies (via output connections 302,304,306,308,310) a high voltage for igniting, and a magnitude-limited current for operating, the lamps 72,74,76,78 within lamp load 70.

Because most of the details concerning the structure and operation of AC-to-DC converter 100, inverter 200, and output circuit 300 are well known to those skilled in the art of electronic ballasts, a comprehensive detailed description of the structure and operation of those circuits is not presented herein. However, for purposes of understanding the present invention, it should be appreciated that the operating frequency of inverter 200 (and, correspondingly, the fundamental frequencies of the electrical signals within inverter 200 and output circuit 300) is dependent upon the operating states of the lamps 72,74,76,78. For instance, if one or more of the lamps 72,74,76,78 is disconnected, fails, or otherwise ceases to operate in substantially normal manner, or if an arcing condition occurs at or in the vicinity of output connections 302,304,306,308 (or, more commonly, in one or more of the sockets in the fixture(s) for lamps 72,74,76,78), the operating frequency of the inverter changes in a significant manner. This is a consequence of the fact that, in a ballast having a self-oscillating inverter, the impedance of the load (i.e., the lamp or lamps) is effectively reflected (hereinafter referred to as the "reflected load impedance") in a manner that directly affects the operating frequency of the inverter. For example, in a ballast configured substantially as described in FIG. 2, the following sample numbers are reflective of the how the inverter operating frequency changes with the number of operable lamps connected to the ballast:

| | |
|---|---|
| Full load (all 4 lamps present): | Operating frequency = 43 kHz |
| 1 lamp removed (3 lamps present): | Operating frequency = 48 kHz |
| 2 lamps removed (2 lamps present): | Operating frequency = 55 kHz |
| 3 lamps removed (1 lamp present): | Operating frequency = 64 kHz |
| No load (all 4 lamps removed): | Operating frequency = 70 kHz |

In the case of other types of lamp fault conditions, such as what occurs during operation of a diode mode lamp or during output arcing, the inverter operating frequency is likewise affected in a substantial (although much less orderly and predictable) manner. For instance, the "sputtering" that is characteristic of diode mode operation essentially introduces, in mathematical terms, a so called "gating" function (i.e., the lamp is effectively connected and disconnected in a repetitive but irregular manner) which has the end result of significantly altering the reflected load impedance that is seen by inverter 200; correspondingly, the operating frequency of the inverter is substantially affected. Along similar lines, output arcing ordinarily has the effect of dramatically increasing the apparent impedance of the affected lamp, thereby also significantly altering the reflected load impedance that is seen by inverter 200, and correspondingly changing the operating frequency of the inverter in a significant manner. Lamp fault protection circuit 400 detects these changes in the operating frequency (via monitoring of a suitable signal within the inverter), and responds by disabling inverter 200 in accordance with the previously described methodology.

As described in FIG. 2, lamp fault protection circuit 400 has a plurality of connections 402,404,406,408,410. First connection 402 is coupled to second inverter transistor 240 and second base drive circuit 250,256,326; more particularly, first connection 402 is coupled to the base 242 of transistor 240. Second connection 404 is coupled to inverter startup circuit 270; more particularly, second connection 404 is coupled to a node 278 at the junction of capacitor 282 and diac 290 within inverter startup circuit 270. Third and fourth connections 406,408 are coupled to AC-to-DC converter 100; more particularly, third and fourth connections 406,408 are coupled to an auxiliary winding 132 of boost inductor 130. Finally, fifth connection 410 is coupled to inverter ground 50.

Referring to FIG. 2, during operation, lamp fault protection circuit 400 monitors, via first connection 402, a voltage signal ($V_X$) within second base drive circuit 250,256,326. $V_X$ is representative of the alternating voltage provided by auxiliary winding 326 that is responsible for commutating second inverter transistor 240. During the starting period, inverter 200 is enabled and allowed to attempt to ignite lamps 72,74,76,78, regardless of whether or not an abrupt change occurs in the fundamental frequency of $V_X$. After completion of the starting period, if an abrupt change is detected in the fundamental frequency of $V_X$, lamp fault protection circuit 400 responds by effectively shunting first and second connections 402,404 to a negative voltage, $V_{NEG}$ (within lamp fault protection circuit 400), for the duration of the shutdown period. Shunting first connection 402 to a negative voltage (i.e., a voltage that is at a somewhat lower potential than inverter ground 50) ensures that inverter 200 is promptly and reliably disabled. Shunting second connection 404 to $V_{NEG}$ for the duration of the shutdown period prevents inverter startup circuit 270 from attempting to restart inverter 200 during the shutdown period. Upon completion of the shutdown period, lamp fault protection circuit 400 ceases to effectively shunt first and second connections 402,404 to the negative voltage. Consequently, inverter 200 is reenabled (i.e., allowed to restart and operate for at least the duration of the starting period).

Figure 3:
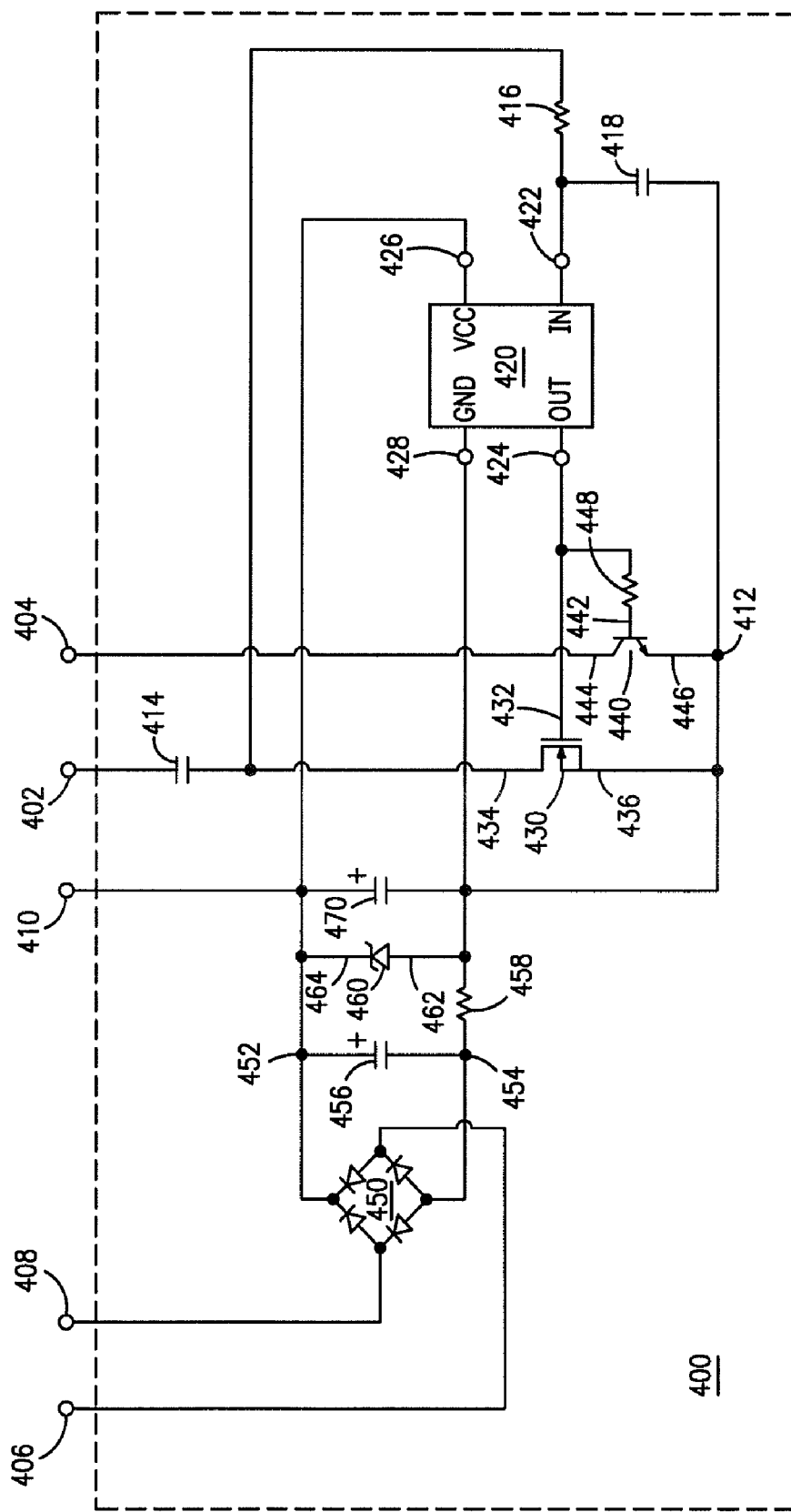
FIG. 3 is a detailed schematic diagram of a lamp fault protection circuit for use in the ballast of FIG. 2, in accordance with a preferred embodiment of the present invention.

Turning now to FIG. 3, in a preferred embodiment of the present invention, lamp fault protection circuit 400 comprises a microcontroller 420, a filter circuit 416,418, a first shunting circuit 414,430, a second shunting circuit 440,448, and a DC voltage supply circuit 450,456,458,460,470. Microcontroller 420 includes an input 422, an output 424, a DC supply input 426, and a ground input 428. DC supply input 426 is coupled to fifth connection 410 (which, in turn, is coupled to inverter ground 50). Ground input 428 is coupled to a reference node 412. As will be described in further detail herein, reference node 412 has a voltage, $V_{NEG}$, that is negative (e.g., −5 volts or so) with respect to inverter ground 50. Filter circuit 416,418 is coupled between first connection 402 (via a capacitor 414) and input 422 of microcontroller 420. First shunting circuit 414,430 is coupled to first connection 402, output 424 of microcontroller 420, and reference node 412. Second shunting circuit 440,448 is coupled between second connection 404, output 424 of microcontroller 420, and reference node 412. DC voltage supply circuit 450,456,458,460,470 is coupled to third and fourth connections 406,408, DC supply input 426 of microcontroller 420, and reference node 412.

Preferably, as described in FIG. 3, first shunting circuit 414,430 comprises a first electronic switch 430 and a first capacitor 414. First electronic switch 430 is preferably realized by a N-channel field effect transistor (FET) having a first (i.e., gate) terminal 432, a second (i.e., drain) terminal 434, and a third (i.e., source) terminal 436. First terminal 432 is coupled to output 424 of microcontroller 420. Third terminal 436 is coupled to reference node 412. First capacitor 414 is coupled between first connection 402 and second terminal 434 of first electronic switch 430. During operation of lamp fault protection circuit 400, first shunting circuit 414,430 functions to disable inverter 200 in response to a lamp fault condition by effectively coupling the base 242 of inverter transistor 240 to reference node 412 via capacitor 414. Because reference node 412 has a negative voltage (e.g., −5 volts with respect to inverter ground 50), inverter 200 is promptly and reliably disabled following activation of first electronic switch 430.

As described in FIG. 3, filter circuit 416,418 preferably comprises a first resistor 416 and a second capacitor 418. First resistor 416 is coupled between first capacitor 414 and input 422 of microcontroller 420. Second capacitor 418 is coupled between input 422 of microcontroller 420 and reference node 412. During operation, filter circuit 416,418 functions as a low-pass filter to attenuate any high frequency noise that may be present in the voltage signal (within inverter 200) that is monitored via first connection 402. It should be appreciated that the attenuation of any high frequency noise is necessary in order to ensure that microcontroller 420 is capable of accurately monitoring the fundamental frequency of $V_X$.

Preferably, as described in FIG. 3, second shunting circuit 440,448 comprises a second electronic switch 440 and a second resistor 448. Second electronic switch 440 is preferably realized as a NPN type bipolar junction transistor (BJT) having a first (i.e., base) terminal 442, a second (i.e., collector) terminal 444, and a third (i.e., emitter) terminal 446. Second terminal 444 is coupled to second connection 404. Third terminal 446 is coupled to reference node 412. Second resistor 448 is coupled between output 424 of microcontroller 420 and first terminal 442 of second electronic switch 440. During operation, second shunting circuit 440,448 functions to ensure that inverter 200 remains disabled during the shutdown period. Second shunting circuit 440,448 accomplishes this by preventing capacitor 282 (within inverter startup circuit 270) from charging up to a voltage (e.g., 32 volts) that is sufficient to trigger diac 290 within inverter startup circuit 270.

Microcontroller 420 is preferably realized by a suitable programmable integrated circuit, such as Part No. PIC10F200 (manufactured by Microchip, Inc.), which has the advantages of relatively low cost and low operating power requirements. Microcontroller 420 is programmed to provide the following functionality for monitoring the fundamental frequency of the voltage signal and for correspondingly enabling or disabling the operation of inverter 200: (1) count a first number of pulses (N1) that occur in the voltage signal at input 422 during a first sampling period (T1); (2) count a second number of pulses (N2) that occur in the voltage signal at input 422 during a second sampling period (T2), wherein the first and second sampling periods have the same sampling duration (TS); (3) compare the second number of pulses (N2) with the first number of pulses (N1), wherein a lamp fault condition is deemed to have occurred if the first number of pulses (N1) and the second number of pulses (N2) differ by more than a predetermined difference limit (e.g., 10 or more); (4) during the starting period, to set a control voltage at output 424 at a first level (e.g., zero volts with respect to reference node 412) that is insufficient to activate first and second electronic switches 430,440, and to maintain the control voltage at the first level for the duration of the starting period; (5) after completion of the starting period, if a lamp fault condition is not present, to maintain the control voltage at output 424 at the first level; (6) after completion of the starting period, if a lamp fault condition is present, to set the control voltage at output 424 at a second level (e.g., +5 volts with respect to reference node 412) that is sufficient to activate first and second electronic switches 430,440, and to maintain the control voltage at the second level for the duration of the shutdown period; and (7) after completion of the shutdown period, to set the control voltage at output 424 at the first level, and to maintain the control voltage at the first level for the duration of the starting period. Preferably, microcontroller 420 also functions, in response to a lamp fault condition remaining present after a predetermined number of starting periods have been successively provided, to increase the shutdown period from a first duration (e.g., 1 second or so) to a second duration (e.g., 5 seconds or so), and to maintain the shutdown period at the second duration until at least such time as a lamp fault condition is no longer present.

Referring again to FIG. 3, in a preferred embodiment of the present invention, DC voltage supply circuit 450,456, 458,460,470 comprises a rectifier circuit 450, a third capacitor 456, a third resistor 458, a voltage regulator 460, and a fourth capacitor 470. Rectifier circuit 450 is preferably realized by a full-wave diode bridge (i.e., with four diodes) that is coupled to third and fourth connections 406,408 (which, in turn, are coupled to auxiliary winding 132, which is magnetically coupled to a primary winding 130 of the boost inductor), a first node 454, and a second node 454. First node 452 is coupled to DC supply input 426 of microcontroller 420 and to fifth connection 410. Third capacitor 456 is coupled between first node 452 and second node 454. Third resistor 458 is coupled between second node 454 and ground input 428 of microcontroller 420. Voltage regulator 460 is preferably realized as a zener diode coupled between DC supply input 426 and ground input 428 of microcontroller 420. Finally, fourth capacitor 470 is coupled between fifth connection 410 and reference node 412. During operation, DC voltage supply circuit 450,456, 458,460,470 rectifies, filters, and regulates the high frequency alternating voltage across auxiliary winding 132 of boost inductor 130 to provide a DC operating voltage (e.g., +5 volts with respect to reference node 412) for powering microcontroller 420. Advantageously, as the boost converter continues to operate (albeit with a drastically reduced duty cycle) even when inverter 200 is disabled, a DC operating voltage will continue to be provided to microcontroller 420, thereby allowing microcontroller 420 to continue to control timing and other logic functions that control the disabling and enabling of inverter 200. In this regard, it is preferred that voltage regulator 460 be realized by a zener diode (e.g., part no. 1N4688) that has a suitably low zener current, as well as a suitably low leakage current so as to maximize the period of time during which DC voltage supply circuit 450,456,458,460,470 continues to provide the DC operating voltage while inverter 200 is disabled. DC voltage supply circuit 450,456,458,460,470 also functions to ensure that the voltage at reference node 412 is negative (e.g., −5 volts) with respect to inverter ground 50; as previously explained, the provision of a negative voltage is important to the goal of promptly and properly disabling inverter 200 when a lamp fault condition is detected.

When implemented with the structure described in FIG. 3, lamp fault protection circuit 400 is capable of being realized in cost-effective and energy efficient manner. Because the timing and logic functions are handled by a microcontroller 420, only a modest amount of associated discrete circuitry is required. Additionally, owing to the fact only a modest amount of discrete circuitry is needed, as well as to the fact that microcontroller 420 may be realized by a device (e.g., Microchip Inc. part no. PIC10F200) having relatively low operating power requirements, lamp fault protection circuit 400 consumes very little power (e.g., around 100 milliwatts or so) and thus exerts minimal impact upon the overall energy efficiency of ballast 20.

The detailed operation of ballast 20 and lamp fault protection circuit 400 is now explained with reference to FIGS. 2 and 3 as follows. In the following description, unless otherwise specified, all voltages are referenced with respect to inverter ground 50.

Within a short period of time after AC power is applied (via input connections 102,104) to ballast 20, boost control circuit 120 turns on and starts to provide switching of boost transistor 140. Once boost control circuit 120 turns on and starts switching boost transistor 140 on and off, corresponding voltages develop across boost inductor 130 and auxiliary winding 132. Even before the boost converter begins to operate, within inverter startup circuit 270, capacitor 282 begins to charge up via resistors 272,276; resistor 280 serves to limit the peak voltage to which capacitor 282 may be charged. Once the voltage across capacitor 282 reaches a predetermined level (e.g., 32 volts), diac 290 becomes conductive and delivers a starting pulse (from the energy stored in capacitor 282) to the base 242 of inverter transistor 240. The starting pulse causes inverter transistor 240 to turn on, thereby initiating self-oscillating operation of inverter 200 in a manner that is well known to those skilled in the art.

Lamp fault protection circuit 400 begins to operate within a short period of time following application of AC power to ballast 20. More particularly, almost immediately after AC power is applied to ballast 20, the DC rail voltage that is present between outputs 106,108 of AC-to-DC converter 100 rapidly reaches the peak value (e.g., 390 volts) of the AC line source voltage (e.g., 277 volts rms), and then increases to an even higher value (e.g., 455 volts) after the boost converter begins to operate. Once the boost converter begins to operate, the voltage that develops across auxiliary winding 132 serves to provide a source of operating power for lamp fault protection circuit 400. More specifically, the alternating voltage across auxiliary winding 132 is processed by DC supply circuit 450,456,458,460,470 within lamp fault protection circuit 400 to provide a regulated DC supply voltage (e.g., +5 volts) to DC supply input 426 of microcontroller 420, thereby powering microcontroller 420 and also providing a negative voltage (e.g., −5 volts with respect to inverter ground 50) at reference node 412.

Once microcontroller 420 is activated, the starting period (having a duration of between, e.g., 200 milliseconds or so and one second or so) begins. During the starting period, the control voltage at output 424 of microcontroller 420 is low (e.g., about zero volts with respect to reference node 412); correspondingly, FET 430 and BJT 440 remain off. Consequently, inverter 200 is allowed operate in order to ignite and power lamps 72,74,76,78.

During normal ignition of lamps 72,74,76,78, as the lamps ignite, signals and frequency changes similar to those which occur during a lamp fault condition may ordinarily occur within inverter 200. As previously discussed, it is important that such occurrences be essentially disregarded by lamp fault protection circuit 400 in order to allow inverter 200 and output circuit 300 to operate for long enough a period of time (e.g., between 200 milliseconds or so and one second or so) in order to successfully ignite lamps 72,74, 76,78. Accordingly, microcontroller 420 is programmed to effectively ignore any frequency changes which occur during the starting period.

At the completion of the starting period (by which point, presumably, all of the lamps are ignited and have started to operate in a substantially normal manner), lamp fault protection circuit 400 begins to actively monitor the fundamental frequency of the base drive voltage ($V_X$) for inverter transistor 240. As previously explained, any significant abrupt change in the fundamental frequency of $V_X$ is treated by lamp fault protection circuit 400 as being indicative of a lamp fault condition. The monitoring of the fundamental frequency of $V_X$ is accomplished as described below.

The voltage at input 422 of microcontroller 420 is substantially a low-pass filtered negative half-wave rectified version of $V_X$. More specifically, FET 430 inherently includes a body diode (with an anode connected to source 436 and a cathode coupled to drain 434) that functions to allow the negative half-cycles of $V_X$ to be transferred (via filter circuit 416,418) to input 422 of microcontroller 420. It should be appreciated that the positive half-cycles of $V_X$ are clamped (i.e., limited in peak magnitude) by the base-to-emitter junction of inverter transistor 240.

Microcontroller 420 is programmed such that each time that the voltage at input 422 exceeds a predetermined value (e.g., roughly corresponding to the peaks of every negative half-cycle of $V_X$), a counter within microcontroller 420 is correspondingly incremented. In this way, microcontroller 420 monitors a quantity representative of the fundamental frequency of $V_X$. Stated another way, microcontroller 420 measures a number of pulses that are indicative of the number of cycles that occur in $V_X$ during a given sampling period.

During the first sampling period (having a duration of, say, 10 milliseconds), microcontroller 420 counts a first number (N1) of pulses. Upon completion of the first sampling period, microcontroller 420 has a dead time period (having a duration of, say, 10 microseconds), during which time no pulse counting is performed. Following the dead time period, microcontroller 420 provides the second sampling period (having a duration that is substantially equal to the duration of the first sampling period—e.g., 10 milliseconds), during which period microcontroller 420 counts a second number (N2) of pulses. The time durations of the first and second sampling periods have been described herein as being "substantially" equal because pertinent timing-related tolerances associated with microcontroller 420 may introduce small differences in the durations of different sampling periods (although, ideally, it is preferred that all sampling periods have the same duration); accordingly, as previously noted, it is important that the predetermined difference limit be set at a value that is large enough (e.g., 10 or so) to accommodate these differences without affecting the reliability and accuracy of detection provided by lamp fault protection circuit 400.

Upon completion of the second sampling period, microcontroller 420 compares N1 and N2. As long as N1 and N2 do not differ by more than the predetermined difference limit (e.g., 10 or so), the control voltage at output 424 remains low, thereby allowing inverter 200 to continue to operate in a normal manner. If, on the other hand, the difference between N1 and N2 exceeds the predetermined difference limit, microcontroller 420 interprets that as an indication that a lamp fault condition has occurred. Correspondingly, the control voltage at output 424 goes high (e.g., +5 volts with respect to reference node 412), thereby turning on FET 430 and BJT 440. With FET 430 turned on, base 242 of inverter transistor 240 is coupled (via capacitor 414) to the negative voltage (e.g., −5 volts) at reference node 412; consequently, inverter transistor 240 will be either turned off or, if currently off, prevented from turning on again, thereby disabling inverter 200. At the same time, with BJT 440 turned on, capacitor 282 (within inverter startup circuit 270) is coupled to the negative voltage (e.g., −5 volts) at reference node 412; consequently, capacitor 282 will be prevented from charging up to a voltage (e.g., +32 volts) that is sufficient to trigger diac 290 and reinitiate operation of inverter 200. The voltage at output 424 of microcontroller 420 remains high (e.g., +5 volts with respect to reference node 412) for the duration of the shutdown period (e.g., 1 second). In this way, lamp fault protection circuit 400 responds to a lamp fault condition by promptly disabling inverter 200 and subsequently preventing inverter 200 from attempting to restart for at least a predetermined period of time (e.g., 1 second).

Upon expiration of the shutdown period (e.g., 1 second after a fault has been detected), the voltage at output 424 of microcontroller 420 goes from high (e.g., +5 volts with respect to reference node 412) to low (e.g., about zero volts with respect to reference node 412), thereby turning off FET 430 and BJT 440. Accordingly, upon completion of the shutdown period, lamp fault protection circuit 400 ceases to effectively shunt first and second connections 402,404 to reference node 412, thereby re-enabling inverter 200 (i.e., allowing inverter startup circuit 270 to restart inverter 200) and then once again allowing inverter 200 to continue to operate for at least the duration of the timed starting period (e.g., 200 milliseconds or more), during which time inverter 200 and output circuit 300 are again allowed to attempt to ignite and begin to operate lamps 72,74,76,78. In this way, lamp fault protection circuit 400 provides automatic restart capability, which accommodates relamping without requiring cycling of the power to the ballast, and also provides a useful degree of immunity to any false/anomalous detection of lamp faults.

In the event of sustained lamp fault condition (i.e., a fault condition that persists for a protracted period of time such as, say, several seconds or more), lamp fault protection circuit 400 will provide a limited number of restart attempts (e.g., 10 or so, in accordance with the previous description), but then transition to a different mode of operation in which the shutdown period is significantly increased (e.g., from about 1 second to about 5 seconds to about one minute or more). This increase in the shutdown period not only serves to prevent frequent (and annoying) flashing of any operational lamps, but also reduces needless stress upon the components in inverter 200 and output circuit 300. The shutdown period will remain at the increased value for as long as a lamp fault condition remains present. At some future point when, presumably, the lamp fault condition is no longer present, lamp fault protection circuit 400 will revert to its normal operating mode (i.e., FET 430 and BJT 440 will be turned off and remain off, thereby allowing inverter 200 to operate in a normal manner, until at least such time as a lamp fault condition subsequently occurs (in which case the aforementioned events will be repeated).

Preferred component values for implementing lamp fault protection circuit 400 are listed as follows:
Capacitor 414: 0.22 microfarad, 50 volt
Resistor 416: 3 kilohm
Capacitor 418: 330 picofarad, 50 volt
Microcontroller 420: Part No. PIC10F200 (mfd. by Microchip, Inc.)
Transistor 430: 2N7002 or FDC301N
Transistor 440: 2N3904
Resistor 448: 47 kilohm
Diode bridge 450: 1N4148 (4 diodes)
Capacitor 456: 100 microfarad, 50 volt
Resistor 458: Two 30.1 kilohm resistors connected in parallel
Zener diode 460: 4.7 volt (Part No. 1N4688)
Capacitor 470: 33 micofarad, 50 volt Although the present invention has been described with reference to certain preferred embodiments, numerous modifications and variations can be made by those skilled in the art without departing from the novel spirit and scope of this invention.

What is claimed is:

1. A ballast for powering at least one gas discharge lamp, the ballast comprising:
an inverter having a load-dependent operating frequency;
an output circuit coupled to the inverter, the output circuit comprising output connections adapted for coupling to a lamp load comprising at least one gas discharge lamp; and
a lamp fault protection circuit coupled to the inverter, wherein the lamp fault protection circuit is operable:
(a) to monitor a fundamental frequency of an electrical signal within the inverter for indication of a lamp fault condition, wherein a lamp fault condition is deemed to have occurred when the fundamental frequency of the electrical signal exhibits a change that exceeds a predetermined change threshold;
(b) to provide a starting period wherein the inverter is enabled and allowed to attempt to start the lamp, independent of occurrence of a lamp fault condition;
(c) in response to occurrence of a lamp fault condition after completion of the starting period:
(i) to disable the inverter and to keep the inverter disabled for a shutdown period; and
(ii) after completion of the shutdown period, to again provide the starting period whereby the inverter is enabled and allowed to attempt to start the lamp, independent of occurrence of a lamp fault condition.

2. The ballast of claim 1, wherein the lamp fault protection circuit is operable to disable the inverter in response to at least one of:
disconnection of a lamp from the ballast;
failure of at least one lamp to operate in a substantially normal manner; and
an arcing condition at the lamp load.

3. The ballast of claim 1, wherein the predetermined threshold change is on the order of at least one of:
between about 0.1% and 1% of a normal operating frequency of the inverter; and
about several hundred hertz.

4. The ballast of claim 1, wherein the lamp fault protection circuit monitors the fundamental frequency of the electrical signal by monitoring the number of cycles that occur in the electrical signal during a sampling period, wherein the sampling period has a sampling duration.

5. The ballast of claim 4, wherein the lamp fault protection circuit is operable to:
provide at least a first sampling period and a second sampling period, wherein:
the second sampling period begins at some point in time after completion of the first sampling period; and
the first and second sampling periods have substantially the same sampling duration;
measure a first number of pulses that are indicative of the number of cycles that occur in the electrical signal during the first sampling period;
measure a second number of pulses that are indicative of the number of cycles that occur in the electrical signal during the second sampling period;
compare the second number of pulses with the first number of pulses, wherein a lamp fault condition is deemed to have occurred if the first number of pulses and the second number of pulses differ by more than a predetermined difference limit.

6. The ballast of claim 5, wherein the lamp fault protection circuit is further operable to provide a dead period between successive sampling periods, the dead period having a predetermined dead time.

7. The ballast of claim 6, wherein the second sampling period begins after completion of the first sampling period and the dead period.

8. The ballast of claim 6, wherein:
the sampling duration is on the order of about 10 milliseconds; and
the predetermined dead time is on the order of about 10 microseconds.

9. The ballast of claim 1, wherein the lamp fault protection circuit is further operable, in response to a lamp fault condition remaining present after a predetermined number of starting periods have been successively provided, to increase the shutdown period from a first duration to a second duration, and to maintain the shutdown period at the second duration until at least such time as a lamp fault condition is no longer present.

10. The ballast of claim 9, wherein:
the first duration is on the order of about one second;
the second duration is on the order of at least several seconds; and
the predetermined number of starting periods is on the order of about ten.

11. The ballast of claim 1, wherein the inverter is at least one of:
(i) a self-oscillating type inverter;
(ii) a current-fed type inverter; and
(iii) a bridge type inverter.

12. The ballast of claim 1, wherein:
the inverter is a current-fed self-oscillating inverter; and
the output circuit includes a parallel resonant circuit.

13. The ballast of claim 1, wherein:
the ballast further comprises an AC-to-DC converter having an input for receiving an AC supply voltage and an output for providing a DC rail voltage to the inverter;
the inverter comprises: (i) first and second inverter transistors; (ii) a first base drive circuit coupled to the first inverter transistor; (iii) a second base drive circuit coupled to the second inverter transistor; (iv) an inverter ground; and (v) an inverter startup circuit coupled to the AC-to-DC converter, the second inverter transistor, and the inverter ground;

the lamp fault protection circuit (400) comprises a plurality of connections, including a first connection (402) coupled to the second inverter transistor and the second base drive circuit, a second connection (404) coupled to the inverter startup circuit, third and fourth connections (406,408) coupled to the AC-to-DC converter, and a fifth connection (410) coupled to the inverter ground; and the lamp fault protection circuit is further operable such that:

the electrical signal that is monitored by the lamp fault protection circuit comprises a voltage signal within the second base drive circuit that is monitored via the first connection;

during the starting period, the inverter is enabled and allowed to attempt to start the lamp, regardless of the nature of the voltage signal at the first connection;

in response to occurrence of a lamp fault condition after completion of the starting period, the inverter is disabled by effectively shunting the first connection and the second connection to a negative voltage for the duration of the shutdown period; and upon completion of the shutdown period, the inverter is re-enabled for the starting period by ceasing to effectively shunt the first and second connections to the negative voltage for the duration of the starting period.

14. The ballast of claim 13, wherein the lamp fault protection circuit further comprises:

a microcontroller (420) having an input (422), an output (424), a DC supply input (426), and a ground input (428), wherein the DC supply input (426) is coupled to the fifth connection (410) and the ground input (428) is coupled to a reference node (412);

a filter circuit (416,418) coupled between the first connection (402) and the input (422) of the microcontroller (422);

a first shunting circuit (414,430) coupled to the first connection (402), the output (424) of the microcontroller, and the reference node (412);

a second shunting circuit (440,448) coupled to the second connection (404), the output (424) of the microcontroller (U1), and the reference node (412); and a DC voltage supply circuit (450,456,458,460,470) coupled to the third and fourth connections (406,408), the DC supply input (426) of the microcontroller, the fifth connection (410), and the reference node (412).

15. The ballast of claim 13, wherein the negative voltage is on the order of about −5 volts with respect to the inverter ground.

16. The ballast of claim 14, wherein the first shunting circuit comprises:

a first electronic switch (430) having first, second, and third terminals (432,434,436), wherein the first terminal (432) is coupled to the output (424) of the microcontroller (420), and the third terminal (436) is coupled to the reference node (412); and a first capacitor (414) coupled between the first connection (402) and the second terminal (434) of the first electronic switch (430).

17. The ballast of claim 16, wherein the first electronic switch (430) is a N-channel field effect transistor, wherein the first terminal (432) is a gate terminal, the second terminal (434) is a drain terminal, and the third terminal (436) is a source terminal.

18. The ballast of claim 16, wherein the filter circuit comprises:

a first resistor (416) coupled between the first capacitor (414) and the input (422) of the microcontroller (420); and a second capacitor (418) coupled between the input (422) of the microcontroller (420) and the reference node (412).

19. The ballast of claim 18, wherein the second shunting circuit comprises:

a second electronic switch (440) having a first, second, and third terminals (442,444,446), wherein the second terminal (444) is coupled to the second connection (404) and the third terminal (446) is coupled to the reference node (412); and a second resistor (448) coupled between the first terminal (442) of the second electronic switch (440) and the output (424) of the microcontroller (420).

20. The ballast of claim 19, wherein the second electronic switch (440) is a NPN type bipolar junction transistor, wherein the first terminal (442) is a base terminal, the second terminal (444) is a collector terminal, and the third terminal (446) is an emitter terminal.

21. The ballast of claim 19, wherein the microcontroller is operable to:

count a first number of pulses indicative of a first number of cycles that occur in the voltage signal during a first sampling period;

count a second number of pulses indicative of a second number of cycles that occur in the voltage signal during a second sampling period, wherein the first and second sampling periods have substantially the same sampling duration;

compare the second number of pulses with the first number of pulses, wherein a lamp fault condition is deemed to have occurred if the first number of pulses and the second number of pulses differ by more than a predetermined difference limit;

during the starting period, to set a control voltage at the output of the microcontroller at a first level that is insufficient to activate the first and second electronic switches, and to maintain the control voltage at the first level for the duration of the starting period;

after completion of the starting period:

if a lamp fault condition is not present, to maintain the control voltage at the first level; and if a lamp fault condition is present, to set the control voltage at the output of the microcontroller at a second level that is sufficient to activate the first and second electronic switches, and to maintain the control voltage at the second level for the duration of the shutdown period; and after completion of the shutdown period, to set the control voltage at the output of the microcontroller at the first level, and to maintain the control voltage at the first level for the duration of the starting period.

22. The ballast of claim 21, wherein:

the first level of the control voltage is set at about zero volts with respect to the reference node; and the second level of the control voltage is set at about +5 volts with respect to the reference node.

23. The ballast of claim 21, wherein the microcontroller is further operable, in response to a lamp fault condition remaining present after a predetermined number of starting periods have been successively provided, to increase the shutdown period from a first duration to a second duration, and to maintain the shutdown period at the second duration until at least such time as a lamp fault condition is no longer present.

24. The ballast of claim 19, wherein the DC voltage supply circuit comprises:
a rectifier circuit (450) coupled to the third and fourth connections (406,408), a first node (452), and a second node (454), wherein the first node (452) is coupled to the DC supply input (426) of the microcontroller (420) and to the fifth connection (410);
a third capacitor (456) coupled between the first and second nodes (452,454);
a third resistor (458) coupled between the second node (454) and the ground input (428) of the microcontroller (420);
a voltage regulator (460) coupled between the DC supply and ground inputs (426,428) of the microcontroller (420); and
a fourth capacitor (470) coupled between the fifth connection (410) and the reference node (412).

25. The ballast of claim 24, wherein:
the AC-to-DC converter comprises a full-wave rectifier (110) and a boost converter (120,130,140,150,160), wherein the boost converter includes a boost inductor having a primary winding (130) and an auxiliary winding (132) that is magnetically coupled to the primary winding; and
the third and fourth connections (406,408) of the lamp fault protection circuit are coupled to the auxiliary winding (132) of the boost inductor.

26. A ballast for powering at least one gas discharge lamp, the ballast comprising:
a self-oscillating type inverter;
an output circuit coupled to the inverter, the output circuit comprising output connections adapted for coupling to a lamp load comprising at least one gas discharge lamp; and
a lamp fault protection circuit coupled to the inverter, wherein the lamp fault protection circuit is operable:
(a) to monitor a fundamental frequency of an electrical signal within the inverter for indication of a lamp fault condition, wherein a lamp fault condition is deemed to have occurred when the fundamental frequency of the electrical signal exhibits a change that exceeds a predetermined change threshold, wherein the lamp fault protection circuit monitors the fundamental frequency of the electrical signal by:
(i) providing at least a first sampling period (T1) and a second sampling period (T2), wherein the second sampling period begins at some point in time after completion of the first sampling period;
(ii) measuring a first number of pulses (N1) that is representative of a number of cycles that occur in the electrical signal during the first sampling period (T1);
(iii) measuring a second number of pulses (N2) that is representative of a number of cycles that occur in the electrical signal during the second sampling period (T2); and
(iv) comparing the second number of pulses (N2) with the first number of pulses (N1), wherein a lamp fault condition is deemed to have occurred if the first number of pulses (N1) and the second number of pulses (N2) differ by more than a predetermined difference limit;

(b) to provide a starting period wherein the inverter is enabled and allowed to attempt to start the lamp, independent of occurrence of a lamp fault condition;
(c) in response to occurrence of a lamp fault condition after completion of the starting period:
(i) to disable the inverter and to keep the inverter disabled for a shutdown period; and
(ii) after completion of the shutdown period, to again provide the starting period whereby the inverter is enabled and allowed to attempt to start the lamp, independent of occurrence of a lamp fault condition.

27. The ballast of claim 26, wherein the lamp fault protection circuit is operable to disable the inverter in response to at least one of:
disconnection of a lamp from the ballast;
failure of at least one lamp to operate in a substantially normal manner; and
an arcing condition at the lamp load.

28. The ballast of claim 26, wherein the lamp fault protection circuit is further operable:
(a) to provide a dead period between successive sampling periods, the dead period having a predetermined dead time; and
(b) in response to a lamp fault condition remaining present after a predetermined number of starting periods have been successively provided, to increase the shutdown period from a first duration to a second duration, and to maintain the shutdown period at the second duration until at least such time as a lamp fault condition is no longer present.

29. The ballast of claim 28, wherein:
the predetermined threshold change is on the order of about several hundred hertz;
the sampling duration is on the order of about 10 milliseconds;
the predetermined dead time is on the order of about 10 microseconds;
the first duration is on the order of about one second;
the second duration is on the order of at least about several seconds; and
the predetermined number of starting periods is on the order of about ten.

30. A ballast for powering at least one gas discharge lamp, the ballast comprising:
an AC-to-DC converter (100) having an input (102,104) for receiving an AC supply voltage (60) and an output (106,108) for providing a DC rail voltage;
a current-fed self-oscillating bridge type inverter (200) coupled to the output of the AC-to-DC converter, the inverter comprising: (i) first and second inverter transistors (220,240); (ii) a first base drive circuit (230,236, 324) coupled to the first inverter transistor; (iii) a second base drive circuit (250,256,326) coupled to the second inverter transistor; (iv) an inverter ground (50); and (v) an inverter startup circuit (270) coupled to the AC-to-DC converter, the second inverter transistor, and the inverter ground;
an output circuit (300) coupled to the inverter, the output circuit comprising output connections (302,304,306, 308,310) adapted for coupling to a lamp load (70) comprising at least one gas discharge lamp (72,74,76, 78); and
a lamp fault protection circuit (400) coupled to the inverter, the lamp fault protection circuit comprising:
a plurality of connections, including a first connection (402) coupled to the second inverter transistor and the second base drive circuit, a second connection (404) coupled to the inverter startup circuit, third and fourth connections (406,408) coupled to the AC-to-DC converter, and a fifth connection (410) coupled to the inverter ground;

a microcontroller (420) having an input (422), an output (424), a DC supply input (426), and a ground input (428), wherein the DC supply input (426) is coupled to the fifth connection (410) and the ground input (428) is coupled to a reference node (412);

a filter circuit (416,418) coupled between the first connection (402) and the input (422) of the microcontroller (420);

a first shunting circuit (414,430) coupled to the first connection (402), the output (424) of the microcontroller (420), and the reference node (412);

a second shunting circuit (440,448) coupled to the second connection (404), the output (424) of the microcontroller (420)), and the reference node (412); and a DC voltage supply circuit (450,456,458,460,470) coupled to the third and fourth connections (406, 408), the DC supply input (426) of the microcontroller (420), the fifth connection (410), and the reference node (412).

31. The ballast of claim 30, wherein:

the first shunting circuit comprises:

a first electronic switch (430) having first, second, and third terminals (432,434,436), wherein the first terminal (432) is coupled to the output (424) of the microcontroller (420), and the third terminal (436) is coupled to the reference node (412); and a first capacitor (414) coupled between the first connection (402) and the second terminal (434) of the first electronic switch (430);

the filter circuit comprises:

a first resistor (416) coupled between the first capacitor (414) and the input (422) of the microcontroller (420); and a second capacitor (418) coupled between the input (422) of the microcontroller (420) and the reference node (412); and the second shunting circuit comprises:

a second electronic switch (440) having a first, second, and third terminals (442,444,446), wherein the second terminal (444) is coupled to the second connection (404) and the third terminal (446) is coupled to the reference node (412); and a second resistor (448) coupled between the first terminal (442) of the second electronic switch (440) and the output (424) of the microcontroller (420).

32. The ballast of claim 31, wherein:

the DC voltage supply circuit comprises:

a rectifier circuit (450) coupled to the third and fourth connections (406,408), a first node (452), and a second node (454), wherein the first node (452) is coupled to the DC supply input (426) of the microcontroller (420) and to the fifth connection (410);

a third capacitor (456) coupled between the first and second nodes (452,454);

a third resistor (458) coupled between the second node (454) and the ground input (428) of the microcontroller (420);

a voltage regulator (460) coupled between the DC supply and ground inputs (426,428) of the microcontroller (420); and a fourth capacitor (470) coupled between the fifth connection (410) and the reference node (412);

the AC-to-DC converter comprises a full-wave rectifier (110) and a boost converter (120,130,140,150,160), wherein the boost converter includes a boost inductor having a primary winding (130) and an auxiliary winding (132) that is magnetically coupled to the primary winding; and the third and fourth connections (406,408) of the lamp fault protection circuit are coupled to the auxiliary winding (132) of the boost inductor.

* * * * *